(12) United States Patent
Momen et al.

(10) Patent No.: US 10,443,905 B2
(45) Date of Patent: Oct. 15, 2019

(54) MAGNETOCALORIC REFRIGERATION USING FULLY SOLID STATE WORKING MEDIUM

(71) Applicant: UT-BATTELLE, LLC, Oak Ridge, TN (US)

(72) Inventors: Ayyoub Mehdizadeh Momen, Knoxville, TN (US); Omar Abdelaziz, Knoxville, TN (US); Edward Allan Vineyard, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 325 days.

(21) Appl. No.: 14/951,191

(22) Filed: Nov. 24, 2015

(65) Prior Publication Data

US 2016/0146515 A1    May 26, 2016

Related U.S. Application Data

(60) Provisional application No. 62/083,972, filed on Nov. 25, 2014, provisional application No. 62/094,655, filed on Dec. 19, 2014.

(51) Int. Cl.
*F25B 21/00* (2006.01)

(52) U.S. Cl.
CPC ...... *F25B 21/00* (2013.01); *F25B 2321/0021* (2013.01); *Y02B 30/66* (2013.01)

(58) Field of Classification Search
CPC ... Y02B 30/66; F25B 21/00; F25B 2321/0021
USPC .......................................................... 62/3.1
See application file for complete search history.

(56) References Cited

U.S. PATENT DOCUMENTS

| | | | |
|---|---|---|---|
| 4,554,790 A | 11/1985 | Nakagome et al. | |
| 4,702,090 A | 10/1987 | Barclay et al. | |
| 5,062,471 A * | 11/1991 | Jaeger | F28D 19/04 165/10 |
| 5,209,068 A | 5/1993 | Saji et al. | |
| 5,339,653 A * | 8/1994 | DeGregoria | A62B 9/003 165/10 |
| 6,332,323 B1 * | 12/2001 | Reid | F25B 29/003 62/6 |
| 2005/0217278 A1 * | 10/2005 | Mongia | F25B 21/00 62/3.1 |
| 2006/0043579 A1 * | 3/2006 | He | H01L 21/823807 257/712 |
| 2007/0186560 A1 * | 8/2007 | Schauwecker | F25B 21/00 62/3.1 |

(Continued)

*Primary Examiner* — Frantz F Jules
*Assistant Examiner* — Steve S Tanenbaum
(74) *Attorney, Agent, or Firm* — Pauley Erickson & Kottis

(57) ABSTRACT

A magnetocaloric cooling system comprising a solid body or bodies, such as a cylinder or cube, having a plurality of channels extending between a first end and a second end of the cylinder or cube and a magnet at least partially surrounding the cylinder or cube. A metallic mass, such as a rod or plate, is positioned within each channel and slides within a respective channel between two sliding extremities so that in each sliding extremity, a portion of each metallic mass extends beyond an end of the solid body. A motor is used for reciprocating the metallic masses between the sliding extremities and a heat exchange mechanism directs heating or cooling where desired.

20 Claims, 4 Drawing Sheets

(56) References Cited

U.S. PATENT DOCUMENTS

| | | | | |
|---|---|---|---|---|
| 2009/0113897 A1* | 5/2009 | Dinesen | ................. | F25B 21/00 62/3.1 |
| 2009/0308080 A1* | 12/2009 | Han | ...................... | F25B 21/00 62/3.1 |
| 2014/0130515 A1 | 5/2014 | Tomimatsu et al. | | |
| 2014/0216057 A1* | 8/2014 | Oezcan | ................. | F25B 21/00 62/3.1 |

* cited by examiner

MAGNETOCALORIC REFRIGERATION USING FULLY SOLID STATE WORKING MEDIUM

CROSS-REFERENCE TO RELATED APPLICATIONS

This patent application claims the benefit of U.S. Provisional Application Ser. No. 62/083,972, filed 25 Nov. 2014, and U.S. Provisional Application Ser. No. 62/094,655, filed 19 Dec. 2014, the disclosures of which are incorporated by reference.

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to a device used for magnetocaloric refrigeration.

BACKGROUND OF THE INVENTION

Magnetocaloric refrigeration is an emerging technology which has potential to be more efficient than conventional vapor compression systems. In the current movement toward energy efficiency, there is a desire to develop a residential refrigerator with at least 25% lower energy consumption relative to current minimum efficiency standards. Conventional refrigerators typically utilize vapor compression cycles and require high GWP refrigerants. An efficient magnetocaloric refrigerator in the market would eliminate the need for such refrigerants.

There are many challenges to design and build an effective magnetocaloric refrigeration unit. Such challenges include materials, magnets, and machine design. Challenges in the material and machine design include: a) hydraulics and sealing problems associated with complicated rotary valve systems required in such systems; and b) material degradation due to density and volume change in material over consecutive cycles. Existing magnetocaloric systems use water or other working fluids to transfer heat to the hot and cold heat exchangers. As a result, pumping systems and complicated valve systems are required. Also, a majority of the existing systems utilize a powdered magnetocaloric material for a generator which is not stable over time due to the rubbing or grinding effect caused by volume change in in the presence of the magnetic field.

A need exists for a refrigerator designed to use the magnetocaloric (MC) refrigeration effect in an efficient manner rather than conventional refrigeration models.

SUMMARY OF THE INVENTION

The subject invention preferably comprises a standalone unit with a heat exchanger on board. This will significantly improve the system efficiency and eliminate the need for many expensive system components such as rotating valves and hydraulic pumps. More importantly, it will significantly lower the amount of required MCM mass and will indirectly help achieve a higher magnetic flux, compared with current permanent magnet technologies, as a result of the lower MCM volume.

A preferred magnetocaloric system utilizes a solid material, preferably in the form of a plurality of solid rods, sheets, plates and/or alternative multiple solid moveable masses, instead of a working fluid. As described above, this may eliminate the need for expensive pump or valve systems as well as eliminating the problem of sealing which is conventionally recognized as problematic. Also in the subject system, instead of using a powdered magnetocaloric material, a solid body or a set of layered discs (that may be separated by thermal insulation), form the magnetic material with a series of through channels which eliminates the problem of rubbing and degradation. Also, since more material can be packed in the same volume using this methodology, the magnetic field utilization will be significantly increased hence the overall cooling/heating power increases.

By developing such an innovative refrigerator, the system can effectively be a plug and play box where on one side it generates cooling and on the other side it generates heating. If applied on an insulated box, it will make a refrigerator or warmer, and if applied on a house it will make cooling or heating system for the house.

Other objects and advantages will be apparent to those skilled in the art from the following detailed description taken in conjunction with the appended claims and drawings.

DETAILED DESCRIPTION OF THE INVENTION

Figure 1:
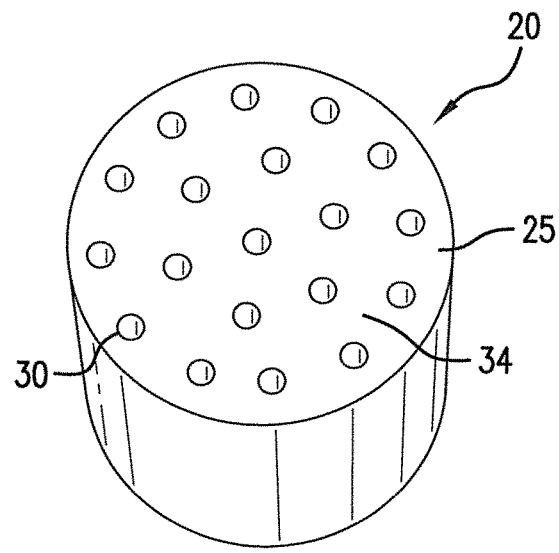
FIG. 1 is a cylinder having a plurality of through channels according to one preferred embodiment of the invention.

As described in more detail below, the present invention provides a magnetocaloric system 10 utilizing a solid body of material 20 with a series of through channels 30 and a solid material 40 instead of a working fluid. The system is used in association with a fluid exchange mechanism 70 to selectively provide heating or cooling to a desired space.

FIG. 1 shows one preferred embodiment of the solid body 20 for use in connection with the subject invention. Preferably, the solid body 20 comprises a generally solid cylinder 25 having a plurality of channels 30 extending between a first end 34 and a second end 36 of the cylinder 25. Alternatively, the solid body 20 may comprise a rectangular or square box, an elliptic cylinder, a parabolic cylinder, or a hyperbolic cylinder. As discussed below, the solid body 20 may comprise a plurality of layered subsections.

FIG. 1 shows the magnetocaloric material cylinder 25, for instance in one preferred embodiment, of Gadolinium having nineteen through channels 30. Alternatively, a smaller array of fewer channels or a larger array of more channels, numbering 500 or more, may be used in connection with the subject invention.

While thus far, magnetocaloric systems use working fluid for heat transfer, the subject invention utilizes solid rods 40 as a heat transfer medium. The rods 40 not only increase the heat transfer rate by the factor of $k_{rod}/(4*k_{fluid})$ which is in order of 100 (100 times faster heat transfer rate than conventional magnetocaloric ("MC") systems) but also eliminate the need for complicated sealing, valve, heat exchanger and pumping system. This also will make the system more compact. Use of solid material opens new options for the development of a cost-effective magnetocaloric refrigeration system.

As such, the subject magnetocaloric cooling system 10 preferably further includes a plurality of metallic rods 40, wherein each metallic rod 40 of the plurality is positioned within a corresponding channel 30 in the solid body 20. Each metallic rod 40 preferably slides within a respective channel between two sliding extremities so that in each sliding extremity, a portion of each metallic rod 40 extends beyond at least one of the first end and the second end of the cylinder 25. This arrangement is shown schematically in FIGS. 2 and 3. Like the solid body 20, the metallic rods 40 may each comprise a plurality of subsections. Metallic masses, such as rods 40, may comprise brass, copper, ferrous, aluminum, and/or other high conductivity materials, such as nickel alloy.

Low cost brass rods may be desirable for use in the subject system. Alternatively or in addition, iron or aluminum may be used. A lubricating fluid, such as oil, may be contained within each channel to lubricate the rods allowing them to slide easier as well as minimizing the heat transfer resistance between the solid body 20 and the metallic rods 40. In addition, or alternatively, a high thermal conductivity grease loaded with graphite nano-platelets may be utilized as a heat transfer enhancement between the solid body 20 and the metallic rods 40.

Alternatively to metallic masses 40, such as rods, a plurality of carbon fiber masses or carbon fiber reinforced plastic masses may be used in connection with the subject invention.

Figure 2:
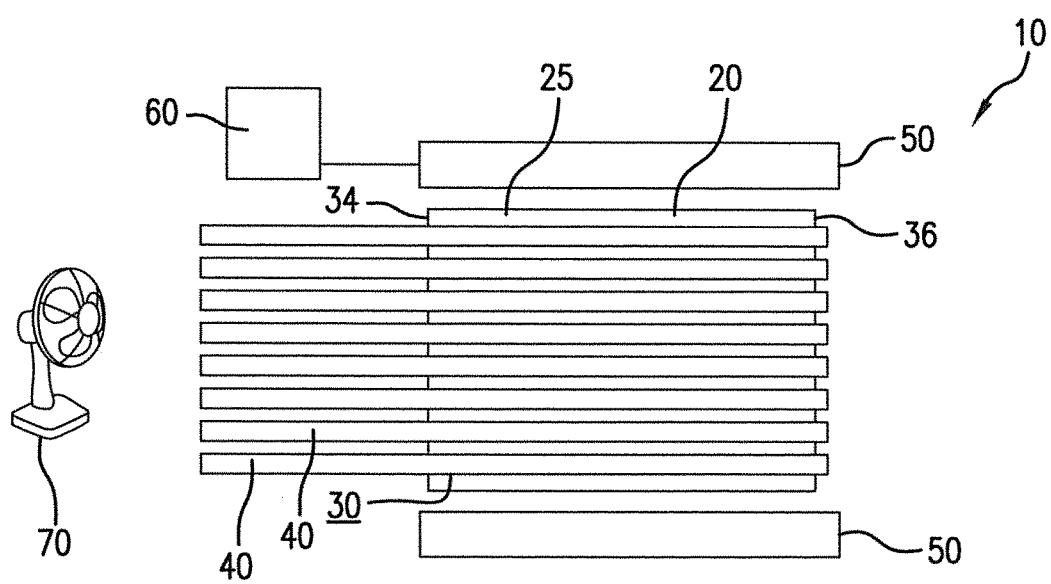
FIG. 2 is a schematic of a magnetocaloric cooling system according to one preferred embodiment of the invention.

As also shown in FIG. 2, a magnet 50 at least partially surrounds the cylinder 25 to assist in the magnetocaloric effect described herein. A motor 60 is further used for reciprocating the metallic rods 40 between the sliding extremities. Specifically, the motor 60 and magnet 50 provide a changing magnetic field to the solid body 20 thereby generating a desired temperature span across the rods 40. In one preferred embodiment, a second motor may be connected to provide reciprocation of the metallic rods 40.

Figure 3:
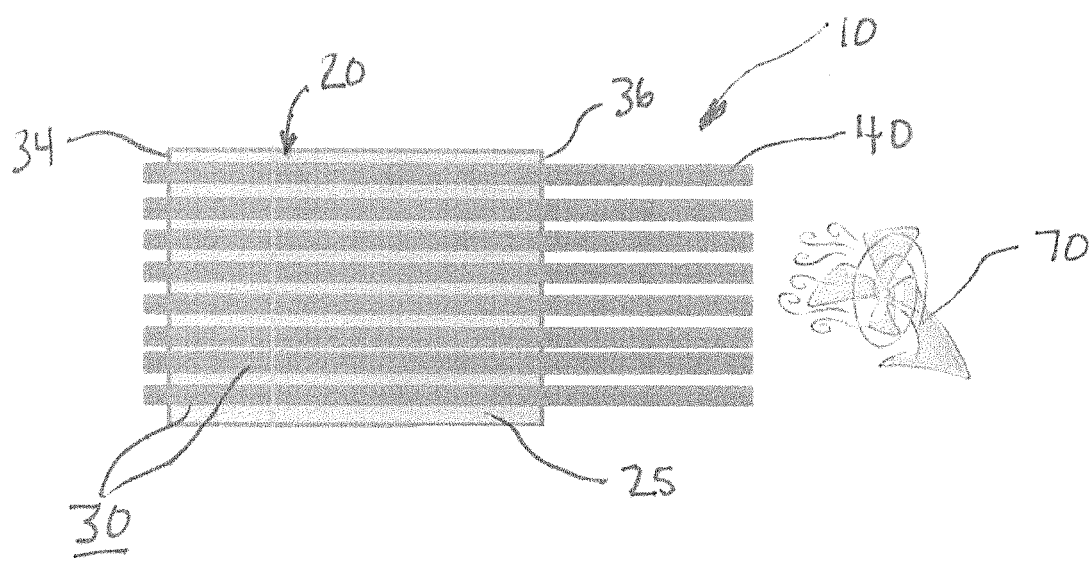
FIG. 3 is a schematic of the magnetocaloric cooling system shown in FIG. 2 wherein the magnetic rods are at an opposite sliding extremity.
Figure 5:
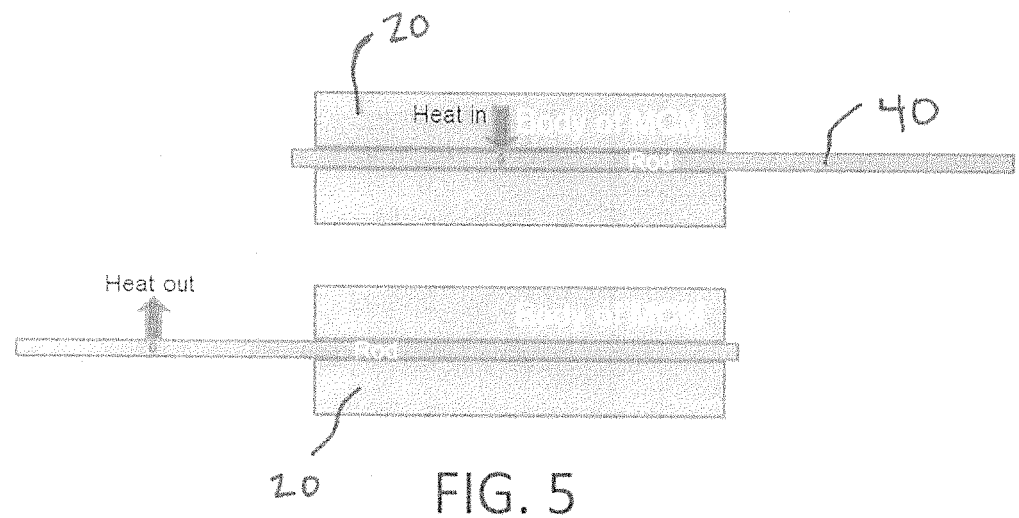
FIG. 5 is a schematic of a magnetocaloric cooling system according to one preferred embodiment of the invention.

FIGS. 2, 3 and 5 show schematic representation of the designed magnetic cooling system 10. The metallic rods 40 absorb heat and move forward and backward as the directed magnetic field turns on/off using the motor 60. The metallic rods 40 thus provide extended surfaces (fins) beyond ends of the solid body 20 which behave like heat exchangers. Using a fluid exchange mechanism, the cooling or heating can be delivered anywhere needed.

The fluid exchange mechanism 70 preferably directs a fluid across the plurality of metallic rods 40. In one embodiment, a single fluid exchange mechanism 70 may be connected with respect to the system through baffles or similar arrangement to provide fluid exchange to each of the first end 34 and the second end 36 of the solid body 20, such as the cylinder 25. In this way, only a single fluid exchange mechanism 70 may be necessary in this invention. Alternatively, a discrete fluid exchange mechanism 70 may be connected with respect to each end of the cylinder. The fluid exchange mechanism 70 in one embodiment comprises an air mover, such as a fan, blower and/or impeller. Alternatively, or in addition, a water or glycol solution may be used in connection with a pump to provide a desired fluid exchange.

As shown in FIGS. 2, 3 and 5, the magnetocaloric cooling system 10 may include metallic rods 40 that are longer than a respective channel 30. In this manner, in a first sliding extremity, a portion of each metallic rod 40 that extends beyond the first end 34 is significantly longer than an opposite portion extending beyond the second end 36. Alternatively, in each sliding extremity, a portion of each metallic rod 40 may extend beyond only one end of the cylinder 25.

Figure 4:
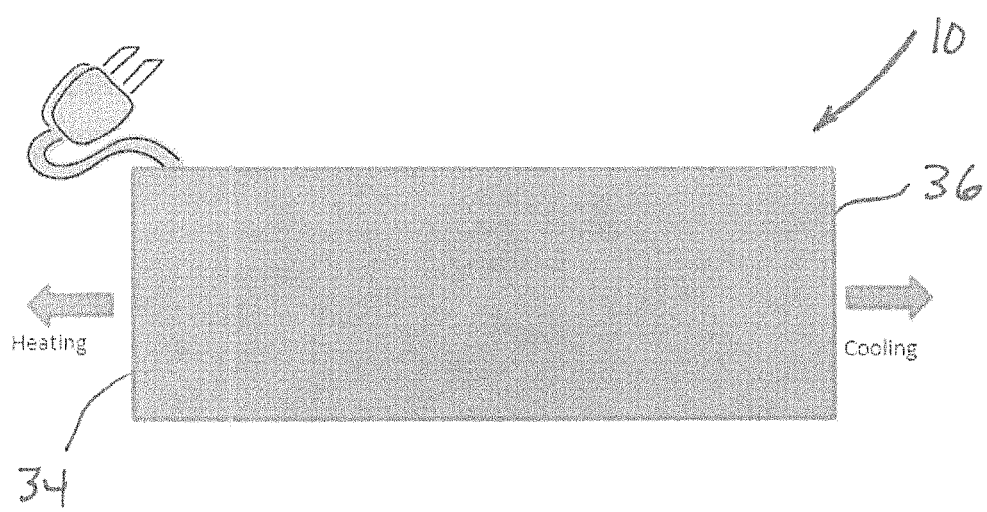
FIG. 4 is a schematic of a magnetocaloric cooling system according to one preferred embodiment of the invention.

As shown schematically in FIG. 4, it is intended that the magnetocaloric cooling system 10 according to this invention may result in a simplified plug-in "box" solution wherein the first end 34 provides heating and the second end 36 provides cooling. The subject invention thus may comprise a standalone unit with heat exchanger on board which can significantly reduce the cost of the machine by eliminating the need for costly traditional components usually required in such units.

Figure 6:
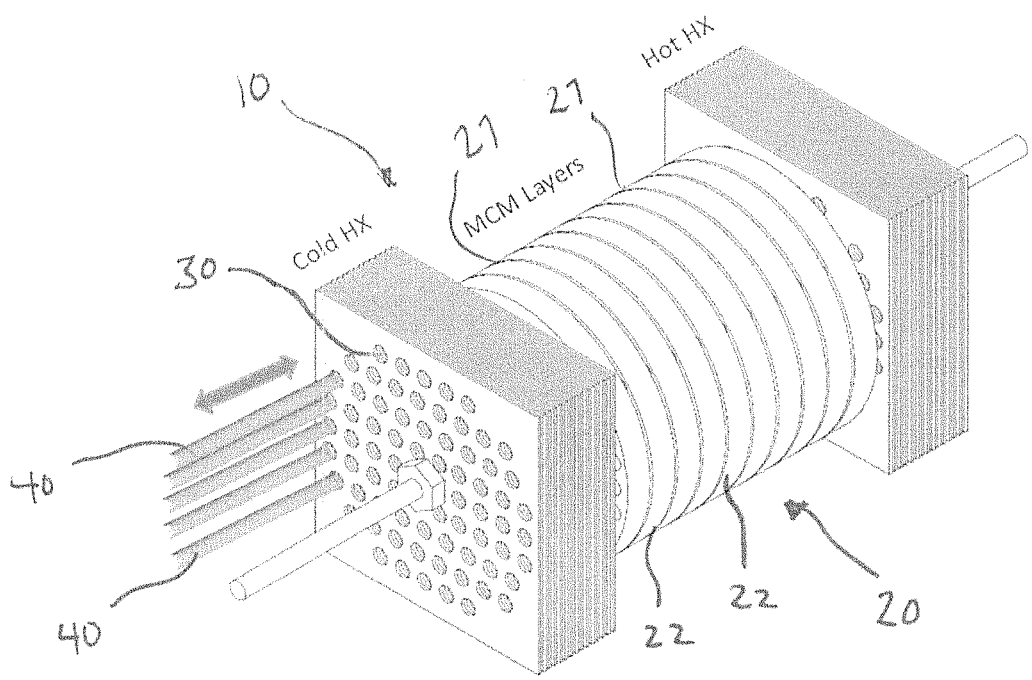
FIG. 6 is a perspective view of a magnetocaloric cooling system according to one preferred embodiment of the invention.

FIG. 6 shows a magnetocaloric cooling system 10 according to one preferred embodiment wherein the solid body 20, such as a cylinder, comprises a plurality of layered subsections 22. As shown the subsections 22 may comprise a plurality of discs that together form the cylinder. In addition, a thermal insulation media 27 may be positioned between one or more of the adjacent subsections to improve the regeneration process.

Figure 7:
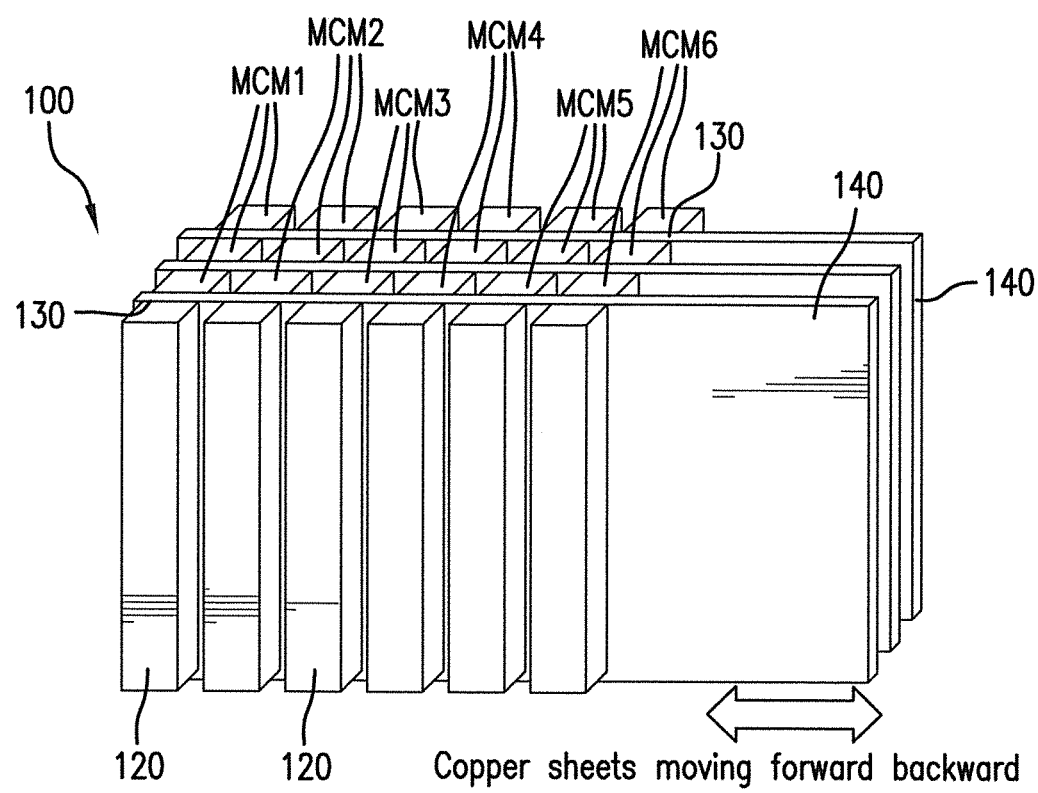
FIG. 7 is a schematic of a magnetocaloric cooling system according to one preferred embodiment of the invention.

FIG. 7 shows a magnetocaloric cooling system 100 according to one preferred embodiment having a plurality of solid bodies 120 with a corresponding plurality of channels 130 and a plurality of solid metallic masses 140. The plurality of solid metallic masses 140 may comprise multiple horizontal and/or vertical segments to minimize the axial/radial/vertical heat transfer rate in metallic masses 140. Perforation, fins or extended surfaces can be added to metallic masses 140 to enhance the heat transfer rate between metallic masses 140 and solid MCM bodies 120. The plurality of solid bodies 120 preferably form an array within which are formed the plurality of through channels 130. As described above, a magnet (not shown) at least partially surrounds the plurality of solid bodies 120. A plurality of metallic masses 140, such as copper sheets as shown in FIG. 7, are positioned within each channel 130 so that each metallic mass slides within a respective channel between two sliding extremities. A motor (not shown) is preferably used for reciprocating the metallic masses 140 between the sliding extremities. As described above, the system is used in association with a fluid exchange mechanism to selectively provide heating or cooling to a desired space. Although shown as rectangular solid bodies 120 with sheets forming the solid metallic masses 140, one embodiment of this invention may comprise alternative geometric forms in the solid bodies 120 and/or the metallic masses 140. Rectilinear, curved, cylindrical, extended surfaces, fins and/or other geometric shapes may be used for the solid bodies 120 and/or the metallic masses 140. Another embodiment of this invention may comprise alternative geometric forms in the solid bodies 120 and/or the metallic masses 140 where both these bodies are segmented or subdivided into much smaller vertical, axial or radial segments to suppress or enhance heat transfer rate to a preferred direction/s. In each case, it is preferable that such a geometric arrangement permits the sliding of the metallic masses 140 within the solid body or solid bodies 140.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A magnetocaloric cooling system comprising:
a solid body comprising a magnetocaloric material and having a plurality of channels extending between a first end and a second end of the solid body;
a magnet at least partially surrounding the solid body, wherein the magnet provides a changing magnetic field to the solid body generating a temperature change to the solid body;
a plurality of solid metallic rods, wherein each channel of the plurality of channels includes a respective metallic rod of the plurality of metallic rods positioned therein, wherein each metallic rod slides within a respective channel between two sliding extremities so that in a first sliding extremity a first portion of each metallic rod extends beyond the first end and in a second sliding extremity a second portion of each metallic rod extends beyond the second end of the solid body, and the plurality of metallic rods operate as a heat transfer medium between the solid body and air at each of the two sliding extremities;
a motor configured to reciprocate the metallic rods between the sliding extremities; and
an air mover configured to direct the air across the first portion and the second portion beyond a corresponding one of the first end and the second end.

2. The magnetocaloric cooling system of claim 1 wherein the solid body comprises one of a cylinder, box, elliptic cylinder, parabolic cylinder, and hyperbolic cylinder.

3. The magnetocaloric cooling system of claim 1 wherein the solid body is formed of a plurality of layered subsections, each subsection separated from an adjacent subsection with a thermal insulation media.

4. The magnetocaloric cooling system of claim 1 further comprising a lubricating fluid contained within each channel.

5. The magnetocaloric cooling system of claim 1 wherein the metallic rods are one of brass, copper, ferrous, aluminum, and/or a high conductivity metallic materials.

6. The magnetocaloric cooling system of claim 1 wherein in the first sliding extremity, the first portion of each metallic rod that extends beyond the first end is multiple times longer than an opposite portion extending beyond the second end.

7. The magnetocaloric cooling system of claim 1 wherein in each sliding extremity, each of the metallic rod extends beyond only one end of the cylinder.

8. The magnetocaloric cooling system of claim 1 wherein the first end provides heating and the second end provides cooling.

9. The magnetocaloric cooling system of claim 1 wherein the metallic rods are longer than a respective channel of the plurality of channels.

10. The magnetocaloric cooling system of claim 1 wherein each metallic rod of the metallic rods comprises a plurality of subsections.

11. A magnetocaloric cooling system comprising:
a cylinder comprising a magnetocaloric material having a plurality of channels extending between a first end and a second end of the cylinder;
a magnet at least partially surrounding the cylinder, wherein the magnet provides a changing magnetic field to the cylinder generating a temperature change to the cylinder;
a plurality of solid metallic masses, within each channel of the plurality of channels includes a respective metallic mass of the plurality of metallic masses positioned therein and having a length longer than a respective channel wherein each metallic mass slides within a respective channel between two sliding extremities so that in each sliding extremity, a portion of each metallic mass extends beyond at least one of the first end and the second end of the cylinder and the plurality of metallic masses operate as a heat transfer medium between the cylinder and air at each of the two sliding extremities;
a motor configured to reciprocate the metallic masses between the sliding extremities; and
an air mover directing the air across the portions of each of the plurality of metallic masses extending beyond the first end and the second end.

12. The magnetocaloric cooling system of claim 11 wherein the cylinder is formed of a plurality of layered subsections.

13. The magnetocaloric cooling system of claim 12 wherein each subsection comprises a disc.

14. The magnetocaloric cooling system of claim 12 wherein each subsection is separated from an adjacent subsection with a thermal insulation media.

15. A magnetocaloric cooling system comprising:
a solid body comprising a magnetocaloric material having a plurality of through channels;
a magnet at least partially surrounding the solid body, the magnet providing a changing magnetic field to the solid body generating a temperature change in the solid body;
a plurality of solid metallic rods, each metallic rod of the plurality of metallic rods positioned within each channel of the plurality of channels, wherein each metallic rod slides within a respective channel between two sliding extremities so that in each sliding extremity, a portion of each metallic rod extends beyond an end of the solid body and the plurality of metallic rods operate as a heat transfer medium between the solid body and air at each of the two sliding extremities;
a motor connected with respect to the magnet for reciprocating the metallic rods between the sliding extremities; and
an air mover configured to direct the air across the portion of each metallic rod in each sliding extremity.

16. A magnetocaloric cooling system comprising:
a plurality of solid bodies comprising a magnetocaloric material forming a plurality of through channels each extending between a first end of the solid bodies and a second end of the solid bodies;
a magnet at least partially surrounding the plurality of solid bodies, wherein the magnet provides a changing magnetic field to the plurality of solid bodies generating a temperature change in the plurality of solid bodies;
a plurality of moveable solid masses, each moveable mass of the plurality of moveable solid masses positioned within a respective channel of the plurality of channels, wherein each moveable solid mass slides within the respective channel between two sliding extremities, wherein in a first sliding extremity a first portion of each moveable solid mass extends beyond the first end of the solid bodies and in a second sliding extremity a second portion of each moveable solid mass extends beyond the second end of the solid bodies, and the plurality of moveable solid masses operate as a heat transfer medium between the plurality of solid bodies and air at the two sliding extremities;

a motor configured to reciprocate the moveable masses between the sliding extremities; and an air mover configured to direct the air across each of the first and second portions beyond a corresponding one of the first end and the second end of the solid bodies.

17. The magnetocaloric cooling system of claim 16 wherein the plurality of solid bodies are formed of smaller subsections.

18. The magnetocaloric cooling system of claim 17 further comprising an insulation layer between each adjacent subsection.

19. The magnetocaloric cooling system of claim 16 wherein the moveable solid masses comprise a plurality of carbon fiber or carbon fiber reinforced plastic masses.

20. The magnetocaloric cooling system of claim 16 wherein the moveable solid masses comprise a plurality of metallic rods or sheets.

\* \* \* \* \*